United States Patent [19]

Mars

[11] Patent Number: 5,188,188
[45] Date of Patent: Feb. 23, 1993

[54] LIGHTWEIGHT POWER TOOLS

[76] Inventor: Suzanne P. Mars, 23649 Duffield Rd., Shaker Hts., Ohio 44122

[21] Appl. No.: 509,572

[22] Filed: Apr. 16, 1990

[51] Int. Cl.$^5$ ............................................. B27B 19/09
[52] U.S. Cl. .................................. 173/171; 173/147; 173/170; 30/392; 30/394
[58] Field of Search ............... 173/171, 170; 30/394, 30/392, 276, 215, 216; 192/67 R; 74/500.5; 439/110, 207, 208

[56] References Cited

U.S. PATENT DOCUMENTS

| | | | |
|---|---|---|---|
| 2,240,755 | 5/1941 | Briggs | 30/394 |
| 2,662,412 | 12/1953 | Miller | 30/216 X |
| 2,698,621 | 1/1955 | Fernandez | 30/394 |
| 4,283,855 | 8/1981 | Nalley | 30/394 |
| 4,531,291 | 7/1985 | Laube | 30/216 |
| 4,544,366 | 10/1985 | Krehbiel | 30/216 |
| 4,721,480 | 1/1988 | Yung | 439/527 |
| 4,729,742 | 3/1988 | Onishi et al. | 439/208 |
| 4,993,502 | 2/1991 | McCullough | 30/276 |

FOREIGN PATENT DOCUMENTS 585297 2/1947 United Kingdom .................. 30/392

*Primary Examiner*—Douglas D. Watts
*Assistant Examiner*—Clark F. Dexter
*Attorney, Agent, or Firm*—Weston, Hurd, Fallon, Paisley & Howley

[57] ABSTRACT

A lightweight power tool includes a housing having a handle and an implement projecting form the housing. A drive mechanism is included as part of the housing for moving the implement relative to the housing. A power source that includes an electric motor is disposed at a location removed from the housing. A flexible power transmission line connects the housing and the power source. The housing includes a transmitter for generating an on-off signal, which transmitter is activated by a manual switch included as part of the housing. The power source includes a receiver for receiving the on-off signal generated by the transmitter. Because the power source is not included as part of the housing, the housing is very lightweight and maneuverable. Accordingly, the power tool can be manipulated conveniently by handicapped persons, those having small hands, or those having less than average strength.

12 Claims, 5 Drawing Sheets

LIGHTWEIGHT POWER TOOLS

BACKGROUND OF THE INVENTION

1. Field of the Invention

The invention relates to power tools and, more particularly, to lightweight power tools especially adapted for use by handicapped persons.

2. Description of the Prior Art

Hand-held power tools generally are of two types: (1) those having self-contained electrical motors disposed within a housing, and (2) those receiving power from a remote source, usually pneumatic. The first-mentioned category of power tools is very common and includes such things as saws, drills, hedge trimmers, and so forth. A drawback of tools of this type is that an electrical motor is disposed within a housing that defines the exterior portion of the tool itself. Frequently, the electrical motors and their associated housings are quite bulky and heavy, particularly if the tools are adapted to perform work that requires a large amount of power.

The second category of hand tools referred to above principally involves pneumatic wrenches. In this category of tool, a large, bulky, heavy housing includes an air motor and a drive member projecting from the housing. The drive member is connected to the air motor for rotation upon activation of the air motor. The drive member is adapted to receive various implements such as sockets, allen wrench extensions, and screwdriver bits. The power source for the air motor usually is a supply of compressed air that is disposed at a location remote from the tool. The tool and the power source are connected by a pneumatic hose. A problem with power tools of this type is that they generally are suitable only for commercial use, and thus they are constructed of large, heavy components. Also, they usually are operated by maintaining high pressure in the line and tool at all times so that they can be activated merely by pulling a trigger included as part of the tool. In order to withstand the high pressures that are imposed upon the tool at all times, it is necessary that the tool be constructed of heavy-duty materials. The foregoing factors make it impossible for pneumatic power tools to be operated by handicapped persons or those having less than average strength.

An additional problem with both of the referenced types of tools is that their housings, particularly their handles and trigger mechanisms, are adapted for use only by persons having at least average strength and maneuvering capability. The handles frequently consist of large-diameter, generally cylindrical portions that project from the housing. It is difficult or impossible for handicapped persons, persons having small hands, or persons having less than average strength to adequately grip the handle and thereafter maneuver the tool. Also, the handles usually have a trigger mechanism that is adapted to be squeezed by one's index finger. While such an arrangement is adequate for most people, those having various disabilities, such as handicapped people, frequently cannot grasp the handle adequately while activating the trigger at the same time.

In view of the foregoing drawbacks of the prior art, it is desired to provide a lightweight power tool that can be grasped readily by virtually anyone, including handicapped people and those having small hands. It also is desired to provide a power tool having an activating switch that can be activated readily while the tool is being held. Additionally, it is desired to provide a power tool that includes a compact, lightweight, easily maneuverable housing that can be manipulated readily by persons having physical disabilities.

SUMMARY OF THE INVENTION

In response to the foregoing considerations, the present invention provides a new and improved lightweight power tool that can be grasped, activated and maneuvered by virtually anyone, including those having physical disabilities, smaller than average hands, and/or less than average strength. The invention includes a housing having a handle and an implement projecting from the housing. The implement typically is a chuck adapted to hold a saw blade, drill bit, screwdriver bit, and so forth. The invention includes a power source located at a location remote from the housing. A flexible power transmission line is connected between the housing and the power source.

The invention includes a transmitter means included as part of the housing for sending an on-off signal to the power source, as well as a receiver means included as part of the power source for receiving the on-off signal generated by the transmitter means. The invention further includes a drive means disposed within the housing, the drive means being connected to the implement. The drive means also is connected to the power transmission line.

In the preferred embodiment, the housing is a lightweight structure made of a molded plastics material. The housing preferably includes a base portion, a vertically extending portion connected to the base portion, a curved member connecting the base portion and the vertically extending portion, and a large opening defined by the base portion, vertically extending portion, and curved member. In this arrangement, the curved member defines the handle.

In the preferred embodiment, the power source includes an electric motor that is connected to a track that is fixedly secured to a ceiling, wall, workbench, and so forth. The track is connected to a source of electric power so that electric current can be provided to an electric motor included as part of the power source. The power source is adapted to be moved along the track and to be secured in a desired, fixed location. The power source includes a rotatable housing portion to which the power transmission line is connected, the rotatable housing portion permitting the power transmission line to swivel about a fixed axis of the power source. The transmitter means preferably is in the form of an infrared signal generator that includes a manually activated switch for controlling operation of the transmitter means.

By virtue of the foregoing construction, the housing is exceedingly lightweight and can be grasped readily by the user for easy maneuverability. Because the power source can be activated simply by pushing the switch located on the housing, it is not necessary for the user to be positioned close to the power source in order to operate the tool. Further, because the tool is activated only upon demand (as opposed to pneumatic tools that always are under pressure), the various components constituting the present invention can be quite small and lightweight.

The foregoing and other features and advantages of the invention are illustrated in the accompanying drawings and are described in more detail in the specification and claims that follow.

DESCRIPTION OF THE PREFERRED EMBODIMENT

Figure 1:
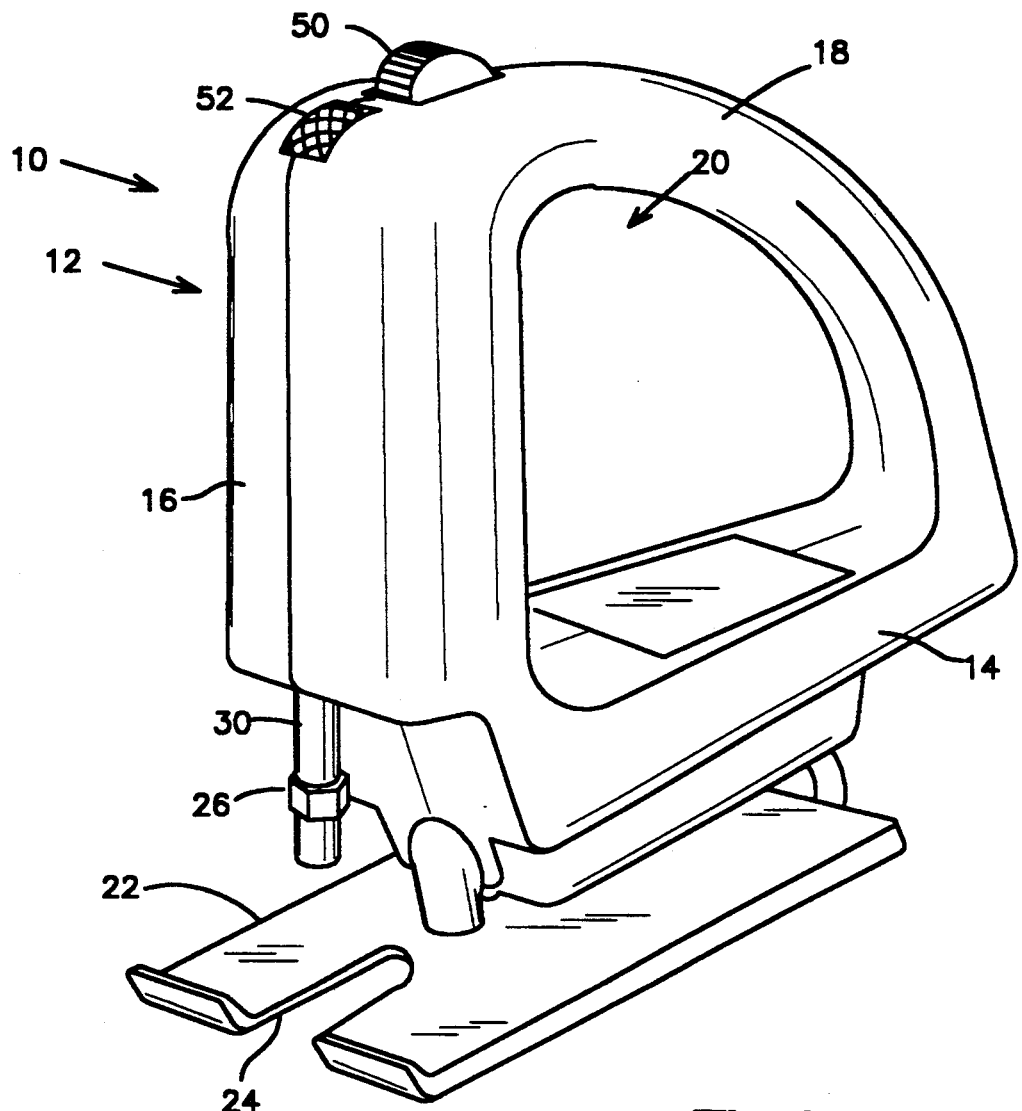
FIG. 1 is a schematic, perspective view of a lightweight power tool according to the invention.
Figure 4:
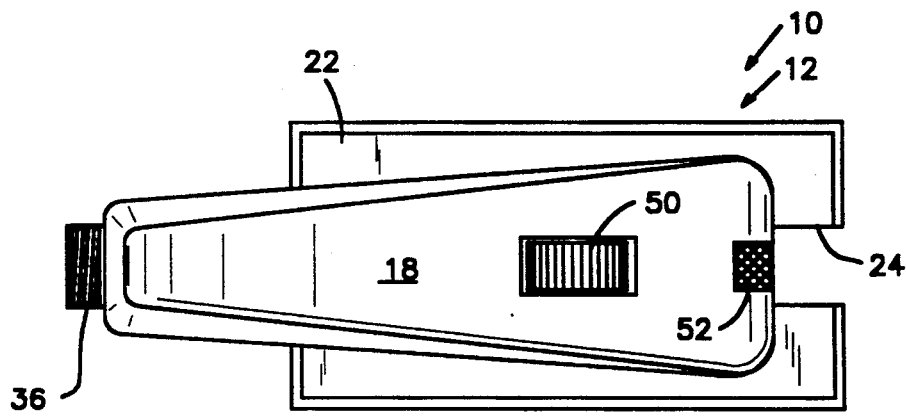
FIG. 4 is a top plan view of the power tool of FIG. 2.
Figure 2:
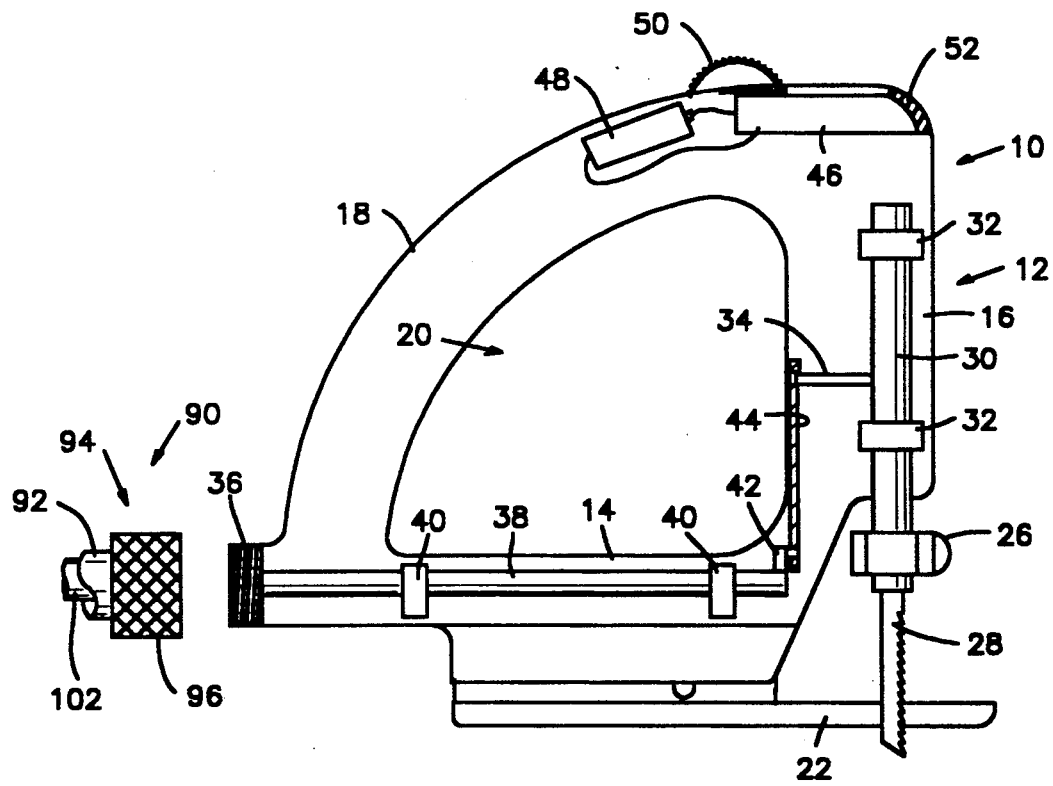
FIG. 2 is a side elevational view of the power tool of FIG. 1, showing a housing having certain portions broken away and removed for clarity of illustration.
Figure 3:
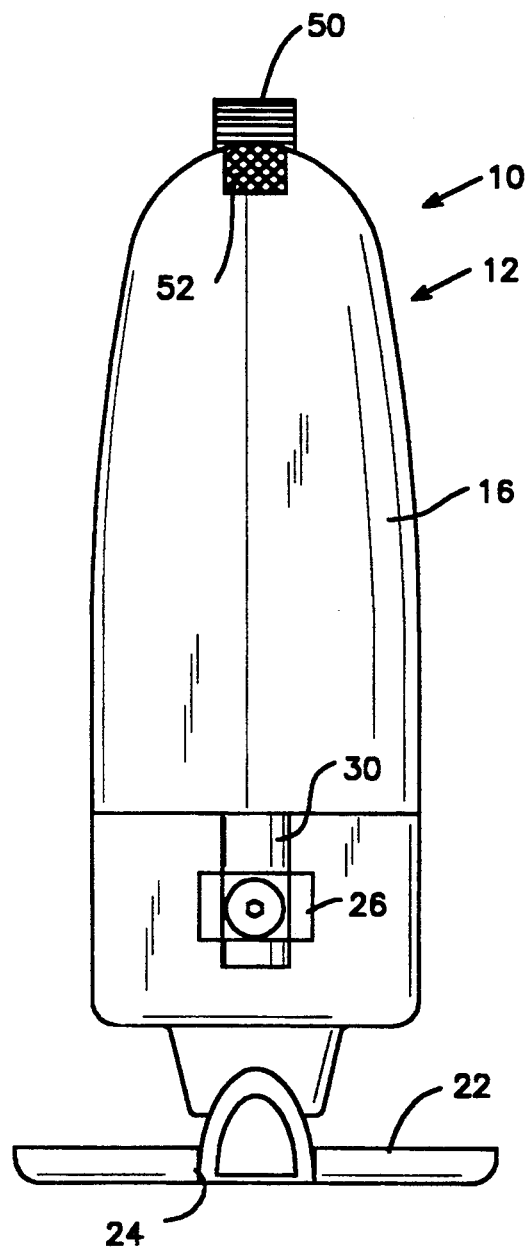
FIG. 3 is an end elevational view of the power tool of FIG. 2.

Referring to the various drawing figures, a lightweight power tool according to the invention is indicated generally by the reference numeral 10. The power tool 10 includes a housing 12, a power source 60, and a power transmission line 90 that is connected between the housing 12 and the power source 60. As will be described more fully hereinafter, the housing 12 is a lightweight, portable unit that is adapted to be grasped easily and maneuvered without difficulty. The power source 60 is adapted to be mounted in a fixed position at a location removed from the housing 12. The power transmission line 90 is a lightweight, flexible member that interconnects the housing 12 and the power source 60 to convey power from the power source 60 to whatever implement may be included as part of the housing 12.

The Housing 12

The housing 12 includes a base member 14, a vertically extending portion 16 connected to the base member 14, and a curved handle 18 that connects the ends of the base member 14 and the vertically extending portion 16. It is to be understood that the phrase "vertically extending portion" refers only to the orientation of the housing 12 as shown in the various drawing figures. It is to be understood that the portion 16 can be moved through a wide variety of orientations other than vertical, and thus the term "vertical" is employed only for convenience. Similarly, other terms of orientation that may be used herein are used only for convenience and are not meant to imply that any particular orientation of the components s described is necessary for successful practice of the invention.

The base member 14, vertically extending portion 16, and curved handle 18 define an opening 20 therebetween. The opening 20 is relatively large so that the user's fingers can readily grasp the handle 18. Also, the handle 18 has a relatively small average diameter on the order of 1.375 inches in order to enable those having small hands to readily grasp the handle 18.

The power tool 10, as illustrated, is a saber saw. Accordingly, an anvil 22 is connected to the bottom of the base member 14. The anvil 22 includes a slot 24 at its forward most end. The power tool 10 includes a chuck 26 adapted to hold a saw blade 28. A piston 30 is disposed partially within the vertically extending portion 16 and partially outside the vertically extending portion 16. The chuck 26 is connected to the exposed end of the piston 30. A pair of spaced bearings 32 are disposed inside the vertically extending portion 16. The bearings 32 receive the piston 30 and support it for reciprocal movement. A pin 34 projects rearwardly from a central portion of the piston 30.

A threaded boss 36 projects from the rearwardmost portion of the base member 14. A drive shaft 38 is disposed within the base member 14 and is supported for rotation therein by bearings 40. The forwardmost end of the drive shaft 38 includes a crank 42 to which a connecting rod 44 is connected. The connecting rod is connected intermediate the crank 42 and the pin 34. The drive shaft 38 includes a drive portion that is disposed adjacent the threaded boss 36.

A transmitter means in the form of an infrared signal generator 46 is disposed within the housing 12 near the intersection of the vertically extending portion 16 and the curved handle 18. A battery 48 is disposed within the housing 12 in order to provide electrical power for the signal generator 46. A spring-biased, manually activated on-off switch 50 is disposed near the uppermost end of the handle 18. A window 52 is formed in the upper, forward portion of the vertically extending portion 16. The window 52 permits an infrared signal generated by the signal generator 46 to be transmitted to the power source 60, as will be described.

It is expected that the housing 12 will be made of a lightweight, molded plastics material such as polystyrene, ABS, or any other well-known plastics material commonly used for power tools. The housing 12 also could be made of a lightweight, cast or stamped metal such as aluminum or magnesium. The piston 30, drive shaft 38, and bearings 32, 40, and associated components, will be made of steel or other materials suitable for adequately, and reliably, transmitting power to the saw blade 28. The selection of the various materials used for components defining the housing 12 and the components disposed within the housing 12 should be known to those skilled in the art, and further discussion here is unnecessary. Similarly, due to the compactness of the various components used as part of the power tool 10, the dimensions of the housing 12 can be adjusted within a wide range. Again, the selection of suitable dimensions for the housing 12 should be within the capability of those skilled in the art. In addition to the functional features of the power tool 10 described herein, the power tool 10 includes non-functional, ornamental features that are intended to provide an attractive, pleasing appearance.

The Power Source 60

Figure 7:
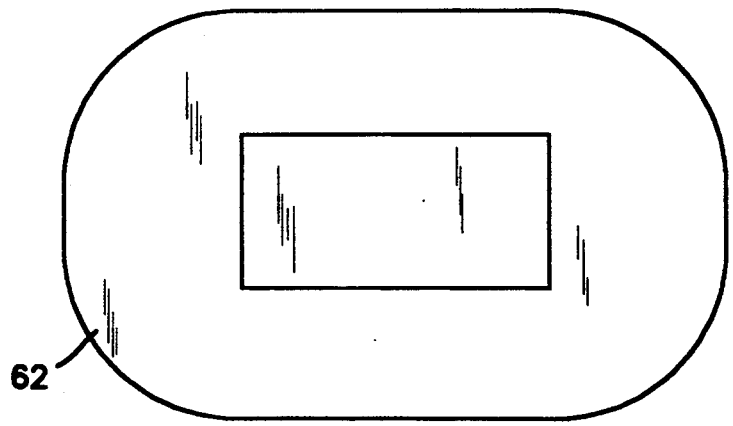
FIG. 7 is a top plan view of the power source of FIG. 5.
Figure 5:
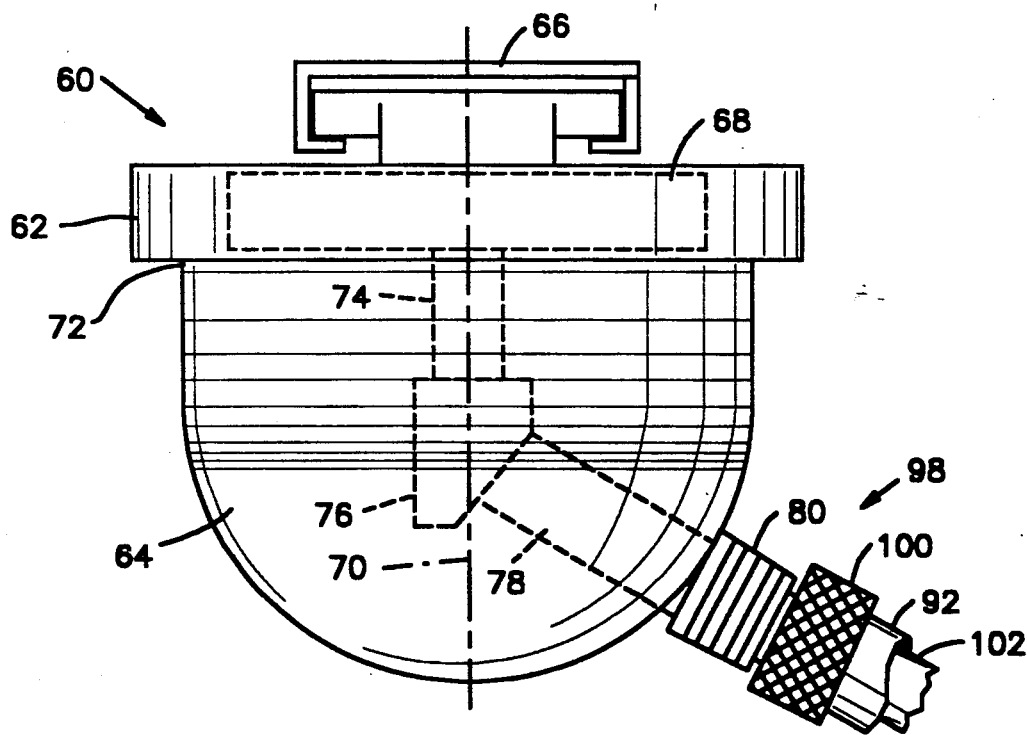
FIG. 5 is a side elevational view of a power source included as part of the invention.
Figure 6:
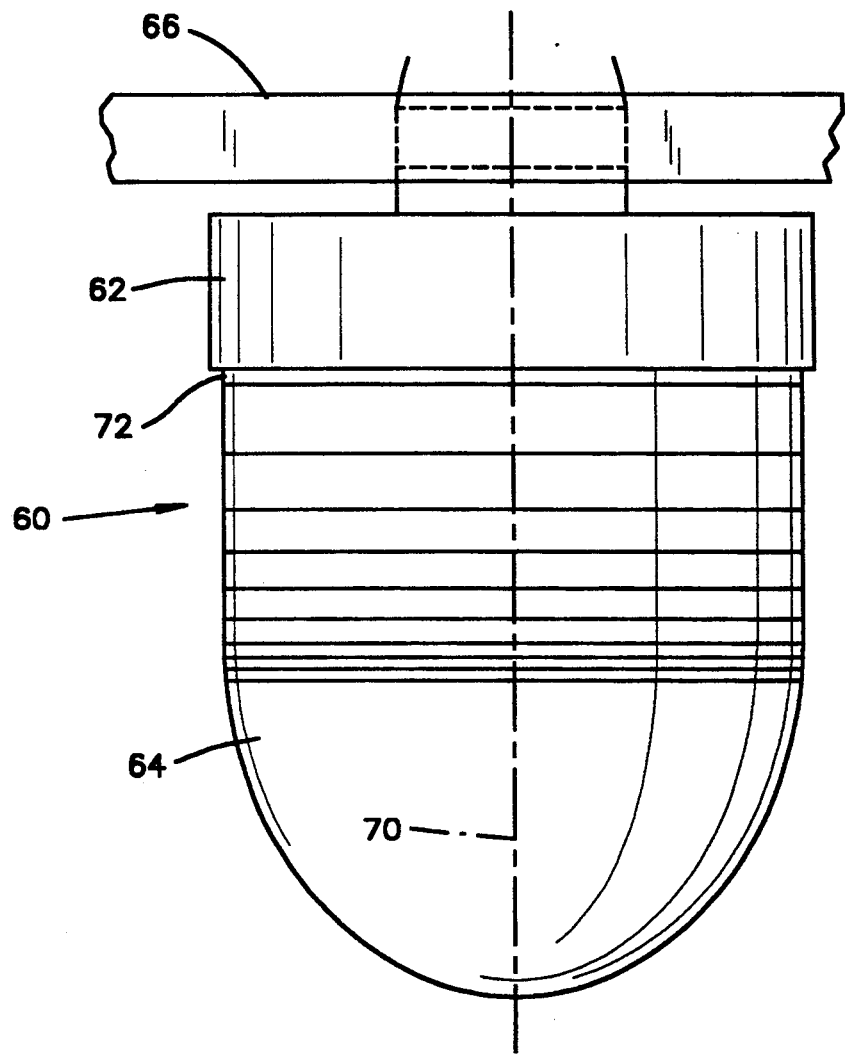
FIG. 6 is an end elevational view of the power source of FIG. 5.

Referring particularly to FIGS. 5–7, the power source 60 includes a first housing portion 62 and a second housing portion 64. A track 66 is provided so that the power source 60 can be conveniently mounted to whatever surface the track 66 is mounted to. The track 66 is connected to a source of electrical power (not shown) so that electrical current can be provided to the power source 60. An electric motor 68 is disposed within the first housing portion 62 and is electrically connected to the track 66 by means of leads (not shown). After the first housing portion 62 has been positioned as desired relative to the track 66 and locked in place (the locking mechanism is not shown), the second housing portion 64 can be pivoted relative to the first housing portion 62 about a fixed axis 70. Pivoting of the second housing portion 64 is permitted by a swivel connection 72 that is established between the first and second housing portions 62, 64.

The motor 68 includes a drive shaft 74 that is connected to a universal joint 76. A drive shaft 78 projects from the universal joint 76. A threaded boss 80 projects from the second housing 64. A portion of the drive shaft 78 is disposed within the boss 80.

The Power Transmission Line 90

The power transmission line 90 includes an elongate, flexible housing 92. The housing 92 can be of any desired length, typically 10-15 feet. The line 90 has a first end 94 that includes a threaded, knurled knob 96 adapted to be connected to the threaded boss 36. The line 90 has a second end 98 that includes a threaded, knurled knob 100 that is adapted to be connected to the threaded boss 80. An elongate cable 102 is disposed within the housing 92 for rotational movement therein. The end of the cable 102 disposed adjacent the first end 94 is connected to the drive portion of the drive shaft 38. Similarly, the end of the cable 102 disposed adjacent the second end 98 is connected to the drive shaft 78.

Operation

In operation, the knobs 96, 100 are connected to the bosses 36, 80, respectively, in order to establish a driving connection from the drive shaft 78 to the drive shaft 38 by means of the cable 102. After the first housing portion has been locked in a desired position along the length of the track 66, the user grasps the handle 18 and points the window 52 toward the power source 60. Upon displacing the switch 50, a signal will be sent from the signal generator 46 to the power source 60, thereby activating the electric motor 68. In turn, power transmitted to the drive shaft 38 will cause the crank 42 to be rotated, the connecting rod 44 to be reciprocated and, with it, the piston 30. When it is desired to stop movement of the saw blade 28, it is only necessary for the window 52 to be pointed to the power source 60 and for the switch 60 to be displaced so as to once again activate the signal generator 46. Upon receiving a second signal from the signal generator 46, the electric motor 68 will be deactivated.

Alternative Embodiments

Although the power tool 10 has been described as having a mechanical drive connection by use of the cable 102, it is to be understood that other drive mechanisms are possible. For example, the housing 92 could be hollow and the electric motor 68 could be used to activate an air pump disposed in the second housing portion 64. In such a circumstance, an air motor, such as a turbine wheel, would be provided within the housing 12. Accordingly, upon directing high pressure air through the housing 92, the turbine (which would be connected to the drive shaft 38) would be rotated so as to cause the piston 30 to be reciprocated.

It also will be understood that various other types of implements could be provided in addition to reciprocating implements such as the saw blade 28. For example, the power tool 10 could be adapted to receive rotating implements. In such a circumstance, the bearings 32 would support the piston 30 for rotational movement only, and the chuck 26 would be adapted for grasping drill bits, screwdriver bits, sanding disks, and the like. By providing a suitable gearing mechanism for the piston 30, the chuck 26 could be rotated as desired. The cable drive that has been illustrated in the various drawings, or other drive mechanisms such as a pneumatic drive as described immediately above, could be used to provide rotational power to the piston 30.

As will be apparent from the foregoing discussion, the invention has been described in its preferred form with a certain degree of particularity, although it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A lightweight power tool, comprising:
    a housing made of a molded plastics material, the housing having a handle and an implement projecting from the housing;
    a flexible power transmission line having two ends, the line being connected at the first end to the housing;
    a power source to which the second end of the power transmission line is connected, the power source being spaced from the housing, the power source including a first housing portion within which an electric motor is disposed and a second, rotatable housing portion connected to the first housing portion, the second end of the power transmission line being connected to the second housing portion, the second housing portion permitting the power transmission line to swivel about a fixed axis of the power source;
    a transmitter means included as part of the housing for sending an on-off signal to the power source, the transmitter means being in the form of an infrared signal generator powered by a battery disposed within the housing;
    receiving means included as part of the power source for receiving the on-off signal generated by the transmitter means, the receiving means adapted to energize and de-energize the electric motor upon receiving an on-off signal from the transmitter means; and
    drive means disposed within the housing, the drive means being connected to the implement for moving the implement relative to the housing, the drive means being connected to the power transmission line for receiving drive power therefrom.

2. The power tool of claim 1, wherein the drive means includes a drive shaft connected to the power transmission line, a crank connected to the drive shaft, and a connecting rod connected to the crank and to the implement.

3. The power tool of claim 2, wherein the power transmission line includes a rotatable cable disposed therein, the cable being connected in driving relationship to the drive shaft and to the electric motor.

4. The power tool of claim 1, wherein the housing includes a base portion, a vertically extending portion connected to the base portion, a curved member connecting the base portion and the vertically extending portion, and a large opening defined by the base portion, the vertically extending portion, and the curved member, the curved member defining the handle of the housing.

5. A lightweight power tool, comprising:
    a housing, the housing having a handle and an implement projecting from the housing;

a flexible power transmission line having two ends, the line being connected at the first end to the housing;

a power source to which the second end of the line is connected, the power source being spaced from the housing;

transmitter means included as part of the housing for sending an on-off signal to the power source, the transmitter means being in the form of an infrared signal generator;

receiving means included as part of the power source for receiving the on-off signal generated by the transmitter means; and drive means disposed within the housing, the drive means being connected to the implement for moving the implement relative to the housing, the drive means being connected to the power transmission line for receiving drive power therefrom.

6. The power tool of claim 5, wherein the power transmission line includes a rotatable cable disposed within the line, the cable being connected to the drive means.

7. The power tool of claim 5, wherein the drive means includes a drive shaft connected to the power transmission line, a crank connected to the drive shaft, and a connecting rod connected to the crank and to the implement.

8. The power tool of claim 5, wherein the implement includes a reciprocal chuck adapted to hold saw blades.

9. The power tool of claim 5, wherein the housing is made of a molded plastics material.

10. The power tool of claim 5, wherein the housing includes a base portion, a vertically extending portion connected to the base portion, a curved member connecting the base portion and the vertically extending portion, and a large opening defined by the base portion, the vertically extending portion, and the curved member, the curved member defining the handle of the housing.

11. The power tool of claim 5, further including a battery disposed within the housing for powering the infrared signal generator.

12. The power tool of claim 5, wherein the housing further includes a manually activated switch for controlling operation of the transmitter means.

* * * * *